Figure 1:
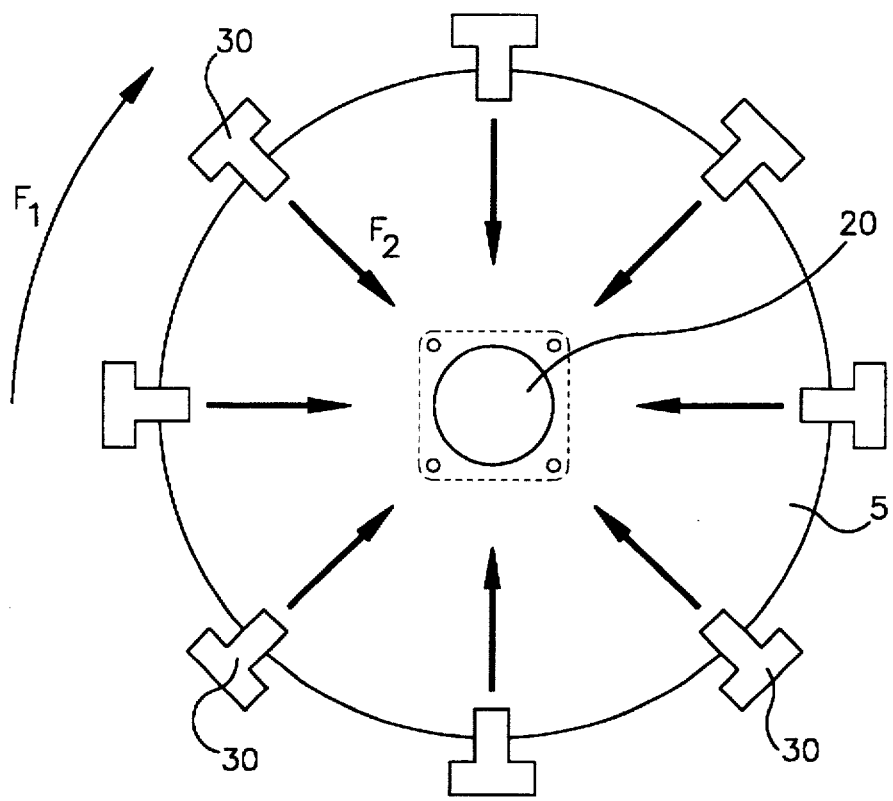

United States Patent [19]

Berti

[11] Patent Number: 5,795,284

[45] Date of Patent: Aug. 18, 1998

[54] METHOD OF AND DEVICE FOR FOLDING A GAS BAG OF A VEHICLE OCCUPANT RESTRAINT SYSTEM

[75] Inventor: Dietmar Berti, Schechingen, Germany

[73] Assignee: TRW Occupant Restraint Systems GmbH, Aldorf, Germany

[21] Appl. No.: 901,340

[22] Filed: Jul. 28, 1997

Related U.S. Application Data

[63] Continuation of Ser. No. 559,192, Nov. 13, 1995, abandoned.

[30] Foreign Application Priority Data

Nov. 15, 1994 [DE] Germany ............... 44 40 845.5

[51] Int. Cl.$^6$ .................................................. B31B 1/26
[52] U.S. Cl. .................... 493/405; 493/454; 493/940; 280/728.1
[58] Field of Search ................. 493/243, 254, 493/260, 261, 267, 314, 405, 406, 450, 451, 454, 458, 940; 53/116–118, 429, 430; 280/728.1, 743.1; 242/532.5, 568.3, 586.5, 529, 910; 426/111

[56] References Cited

U.S. PATENT DOCUMENTS

| | | | |
|---|---|---|---|
| 2,815,883 | 12/1957 | Robins et al. | 426/111 |
| 2,942,794 | 6/1960 | Huso | 242/397 |
| 3,010,372 | 11/1961 | Lanford | 493/405 |
| 3,839,947 | 10/1974 | Komas et al. | 493/244 |
| 3,839,948 | 10/1974 | Putti et al. | 493/244 |
| 3,848,821 | 11/1974 | Scheel | 242/55 |
| 4,173,356 | 11/1979 | Ross . | |
| 4,767,394 | 8/1988 | Ito et al. | 493/454 |
| 5,022,675 | 6/1991 | Zelenak, Jr. et al. | 280/743 |
| 5,290,061 | 3/1994 | Bollaert | 280/743.1 |
| 5,300,011 | 4/1994 | Budde et al. | 493/405 |
| 5,360,387 | 11/1994 | Baker | 493/405 |
| 5,375,393 | 12/1994 | Baker et al. | 53/429 |
| 5,391,137 | 2/1995 | DePoy et al. | 493/405 |
| 5,456,651 | 10/1995 | Baker et al. | 493/405 |
| 5,492,367 | 2/1996 | Albright et al. | 280/728.1 |
| 5,547,218 | 8/1996 | Kuretake et al. | 280/743.1 |
| 5,690,358 | 11/1997 | Marotzke . | |

FOREIGN PATENT DOCUMENTS

| | | |
|---|---|---|
| 0370613A1 | 5/1990 | European Pat. Off. . |
| 0443485A1 | 8/1991 | European Pat. Off. . |
| 0671296A2 | 9/1995 | European Pat. Off. . |
| 0734911A1 | 10/1996 | European Pat. Off. . |
| 2251493 | 5/1973 | Germany . |
| 2524770 | 12/1976 | Germany . |
| 4227559A1 | 2/1994 | Germany . |
| 4343026A1 | 6/1994 | Germany . |
| 4424276C2 | 7/1996 | Germany . |
| 19516494 | 10/1996 | Germany . |
| 3279053 | 3/1990 | Japan . |
| 585292 | 9/1991 | Japan . |
| 446842A | 2/1992 | Japan ............... 280/743 |
| 08127301A | 5/1996 | Japan . |

OTHER PUBLICATIONS

Japanese Publication No. JP2291363 (Abstract only).
Japanese Publication No. JP58049541 (Abstract only).
Japanese Publication No. JP3167048 (Abstract only).

*Primary Examiner*—Michael J. Carone
*Assistant Examiner*—Darren Ark
*Attorney, Agent, or Firm*—Tarolli, Sundheim, Covell, Tummino & Szabo

[57] ABSTRACT

A method of folding a gas bag (5) for a vehicle occupant restraining system which when inflated is three-dimensional in shape and is folded from a deflated, flattened and spread-out condition, in which its wall comprises a securing section featuring an inflation port (20), a section opposite thereto and a junction section between said two wall sections, into a shape adapted to the interior space of a receiving compartment is characterized in that folding the gas bag is done substantially by turning at least two wall sections relative to each other.

3 Claims, 1 Drawing Sheet

METHOD OF AND DEVICE FOR FOLDING A GAS BAG OF A VEHICLE OCCUPANT RESTRAINT SYSTEM

This is a continuation of application Ser. No. 08/559,192 filed on Nov. 13, 1995 now abandoned.

The present invention relates to a method of and a device for folding a gas bag of a vehicle occupant restraint system in view of its accomodation in a receiving compartment.

In prior art, the gas bag for a vehicle occupant restraining system is ordinarily folded manually, this being substantially done as follows: the gas bag is secured by a securing plate surrounding its inflation port and spread out on a folding table in a deflated, flattened condition. Then, folding paddles separately hinged on a stand are pivoted down one after the other onto the spread-out gas bag, and the gas bag is folded over each folding edge formed by these folding paddles. Due to the sequence of hinging down the corresponding folding paddles and folding the gas bag accordingly, the gas bag is translated from its original, spread-out shape into a folded shape, in which it can be deposited in the interior space of a receiving compartment. On completion of folding, the folding paddles are withdrawn from the folded gas bag.

This method according to prior art, which may be employed for the gas bags on both the driver's side and the front passenger's side, has several drawbacks. Firstly, actuating the folding paddles is an activity which is ergonomically difficult. Furthermore, there is the risk in using the folding paddles that the gas bag is damaged during folding should the folding paddles have a sharp edge. Finally, such a method of folding, necessitating roughly 20 steps in folding, is a time-consuming operation. Known folding methods take up between 2 and 4 minutes depending on the size and the way in which the gas bag is mounted.

More recently, automated folding devices were proposed which operate with complicated three-dimensional folding movements, thus eliminating the folding paddles. Unwanted fabric folds which are eliminated manually when folding is done by hand, are eliminated in automatic folding by a combined action of compressed air and vacuum. However, these automated folding methods are able to reduce the time needed for folding only slightly; in addition, the devices are highly expensive due to the relatively complicated sequence of movements needed in folding.

The object of the invention is to substantially reduce the processing time needed in folding a gas bag.

According to the present invention, a method of folding a gas bag for a vehicular occupant restraint system is provided, said gas bag, in an inflated state, having a three-dimensional shape and, when deflated, flattened and spread-out in a plane, having a rear wall section with a central wall zone wherein an inflation opening is defined, a front wall section lying opposite the rear wall section and a connecting wall section interconnecting peripheral zones of the rear and front wall sections. In the inventive method, the rear and front sections are rotated with respect to each other about an axis substantially normal to the plane on which the bag is spread-out.

By employing a turning movement instead of a plurality of folds to be made in sequence about separate folding lines the complete procedure may be implemented essentially in a single step, which reduces the processing time needed substantially.

In the preferred embodiment, relative rotation between the rear and front wall sections is achieved by holding stationary the central wall zone and rotating the interconnecting peripheral zone. Preferably, the junction wall section is clamped at an outer periphery thereof at a plurality of circumferentially spaced clamping locations and the central wall zone is engaged and held for relative rotation with respect to said junction wall section. In addition, the junction wall section engaged at the clamping locations is moved radially inwardly towards the inflation opening while the rear and front wall sections are rotated with respect to each other.

A device according to the invention for implementing the method is also provided. The device comprises holding means for holding the central wall zone, clamping means engaging the connecting wall section at circumferentially spaced locations thereof and rotating means for rotating the holding means and clamping means relative to each other about an axis substantially normal to the plane in which the bag is spread-out. In the preferred embodiment of the device the holding means are stationary and the clamping means are rotated by said rotating means. Preferably, the device comprises moving means for moving the clamping means radially inwardly towards the inflation opening while the holding and clamping means are rotated with respect to each other.

Figure 2:
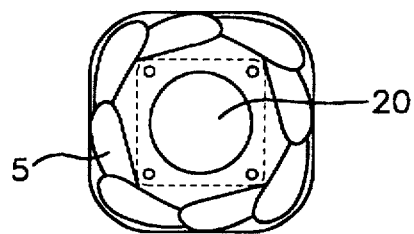

The advantages and features of the invention will be evident in particular from the following description with reference to the enclosed drawing in which:

FIG. 1 is a schematic plan view of a gas bag prior to folding, together with clamping means of the device for folding; and FIG. 2 is a schematic view of the gas bag shown in FIG. 1 after folding.

In FIG. 1, a generally known gas bag 5 is shown, having an inflation port 20. The wall of the gas bag 5 comprises a fastening section on the side of its inflation port 20, a section opposite to this wall section and a junction section between these wall sections.

The gas bag 5 is shown in its deflated, flattened conditioned in FIG. 1, in which it is spread out on a folding surface (not shown) of a folding device indicated merely schematically.

Apart from the folding surface, this device features substantially a holding means, capable of holding the fastening section of the gas bag 5 non-rotatably, as well as a clamping assembly substantially comprising clamping means 30 designed to grip the gas bag by its junction section at locations stated to be clamping locations.

These clamping means 30 may be known gripping elements, disposed movably on the clamping assembly such that they may be moved in the direction of the inflation port 20 of the gas bag 5 and away therefrom. In this arrangement, the clamping means 30 may be so disposed that they are passively movable by a tugging action exerted by the gas bag 5 via the clamping locations on the clamping means or actively by displacement elements. In the embodiment shown, the clamping assembly has eight clamping means 30 disposed spaced away from each other along the periphery of the gas bag 5 to be folded. When the gas bag 5 to be folded is round, as shown in FIG. 1, the clamping means 30 are thus disposed in a circular arrangement.

The procedure of the method according to the invention for folding a gas bag is as follows: the gas bag 5 is arranged on the folding surface, and the holding means fixes its fastening section. The clamping means 30 grip the gas bag at the clamping locations. This is followed by the clamping assembly being turned relatively to the holding means, for example in the direction of the arrow F1 in FIG. 1. Due to this turning movement, the outer diameter of the gas bag 5 is reduced, this being the reason why the clamping means 30 holding the gas bag needs to follow the gas bag in the direction of the arrow $F_2$ of FIG. 1. This follow-up may be active or passive.

It will be appreciated that due to the turning movement of the clamping locations along the arrow $F_1$ relatively to the inflation port 20 superimposed with the translational movement along the arrow $F_2$, the clamping locations of the gas bag 5 and thus also the clamping means 30 are moved along a spiral path towards the inflation port 20, it thus being obvious that the wall of the gas bag 5 is disposed around the inflation port 20 in a wrapping-type movement. This turning movement may be continued until the gas bag 5 assumes the shape as shown in FIG. 2. It is thus evident that in this folded condition of the gas bag 5 the complete wall of the gas bag 5 is arranged bead-like around the inflation port 20, the clamping locations coming to rest on the outer surface of the folded gas bag.

This turning movement may be continued until the desired packing density of the fold is achieved, a limit to the packing density being dictated substantially only by a possible tear in the fabric.

The method according to the invention may be employed in the same way also for gas bags which in the spread-out condition have a configuration other than circular, as is the case e.g. for a front passenger gas bag. The only difference to the procedure as described above is that, since the arrangement of the clamping means 30 is essentially adapted to the configuration of the gas bag when spread out, in this case the clamping means 30 are not arranged circularly.

On completion of folding, the folded gas bag may be deposited in a receiving compartment provided for its accommodation, so that it need not be additionally prevented from unfolding. The method according to the invention has particularly the advantage that the processing time necessary in executing folding of a gas bag is reduced to a time period in the order of five seconds.

A gas bag 5 which has been folded by the method according to the invention has the advantage that contrary to a gas bag folded according to prior art, in which a substantial part of the wall is located before the inflation port and thus needs to be moved away from the inflation port by the gas pressure within the gas bag when the latter is inflated, the substantial part of the wall of the gas bag according to the invention is disposed surrounding the inflation port 20 so that the gas flow streaming into the gas bag 5 to inflate it is not first hampered by the wall located to a major extent in front of the inflation port 20.

Contrary to a gas bag folded according to prior art, which during inflation needs to unfold the many folds implemented in folding, a gas bag 5 according to the invention unfolds itself by the turnings of the wall sections produced during folding being released by being turned in the opposite direction, thus facilitating unfolding of the gas bag 5.

Finally, the device according to the invention has the advantage that the movement implemented by it, which is essentially merely a turning movement, is very much easier to execute than the complicated folding movements of the devices according to prior art.

What is claimed is:

1. A method for folding a gas bag for a vehicle occupant restraint system, said method comprising the steps of:

providing a gas bag having a rear wall section, a front wall section lying opposite said rear wall section, and a junction wall section interconnecting peripheral zones of said front and rear wall sections, said rear wall section including a central wall zone in which an inflation opening is defined, said gas bag having an inflated state in which said gas bag has a three-dimensional shape and a deflated state in which said gas bag has a flattened state and lies substantially in a single plane;

positioning said front and rear wall sections of said gas bag in said deflated state opposite each other and in an overlying relationship;

holding stationary only said central wall zone of said rear wall section while an overlying portion of said front wall section overlying said central wall zone of said rear wall section remains free to move relative to said stationary central wall zone of said rear wall section; and rotating said peripheral zones of said front and rear wall sections about an axis which is substantially normal to said plane thereby causing said overlying portion of said front wall section of said gas bag to be rotated relative to said central wall zone of said rear wall section.

2. The method of claim 1 further comprising the step of:

clamping said junction wall section of said gas bag at a plurality of circumferentially spaced clamping locations prior to said step of rotating said peripheral zones of said front and rear wall sections, said step of rotating said peripheral zones comprising rotating said plurality of clamping locations.

3. The method of claim 2 further comprising the step of:

moving said junction wall section of said gas bag clamped at said plurality of clamping locations radially inward toward said central wall zone as a result of said step of rotating said peripheral zones of said front and rear wall sections while said central wall zone of said rear wall section is being held stationary, said moving of said junction wall section radially inward causing said gas bag to be folded along a spiral path.

* * * * *